United States Patent
Wang

(10) Patent No.: US 6,321,641 B1
(45) Date of Patent: Nov. 27, 2001

(54) MULTI-CHAMBER BREAD-BAKING MACHINE

(76) Inventor: Donglei Wang, No. 4 Workshop Building, Pinglanyuan Industrial Zone, Nanping Town, Zhuhai, Guangdong Province, (519060) (CN)

( * ) Notice: Subject to any disclaimer, the term of this patent is extended or adjusted under 35 U.S.C. 154(b) by 0 days.

(21) Appl. No.: 09/606,218

(22) Filed: Jun. 29, 2000

(30) Foreign Application Priority Data

Jul. 2, 1999 (CN) .......................................... 99236519 U
Sep. 15, 1999 (CN) .......................................... 99238752 U

(51) Int. Cl.[7] .................................................. A47J 27/00
(52) U.S. Cl. ................................. 99/348; 99/331; 99/339
(58) Field of Search ............................. 99/348, 341, 331, 99/385, 389, 339; 366/98, 145, 146, 149

(56) References Cited

U.S. PATENT DOCUMENTS 4,294,166 * 10/1981 Takeuchi ................................ 99/348
5,022,315 * 6/1991 Bertram et al. ....................... 99/348
5,054,383 * 10/1991 Cho ..................................... 99/348 X
5,363,746 * 11/1994 Gordon ............................... 99/348 X
5,839,356 * 11/1998 Dornbush et al. ...................... 99/331

* cited by examiner

Primary Examiner—Reginald L. Alexander
(74) Attorney, Agent, or Firm—Nath & Associates PLLC; Gary M. Nath; Marvin C. Berkowitz

(57) ABSTRACT

A novel multi-chamber bread-baking machine is provided, which comprises a housing for housing all the parts of the bread-baking machine; one oven or a plurality of ovens; a plurality of bread chambers positioned in the oven(s); and a driving mechanism for driving stirring blades in the chambers. As a result, bread of various tastes with different ingredients can be baked at the same time, with each independent unit baking bread of a certain recipe, so as to meet people's different tastes.

5 Claims, 3 Drawing Sheets

MULTI-CHAMBER BREAD-BAKING MACHINE

FIELD OF THE INVENTION

The present invention relates to a food processing appliance, and more specifically to a novel multi-chamber bread-baking machine.

BACKGROUND OF THE INVENTION

Along with the improvement of people's living standards, bread-baking machines have gradually become household appliances. As shown in FIG. 1, the bread-baking machines now available on the market comprises a drive system 1, a heating elements 2, a base assembly 3, a drive axle 4, a base board 5, a chamber base 6, a housing 7, an oven 8, a bread chamber is 9, a top cap 10, a circuit board 11, a stirring axle 12, a stirring blade 13 and a motor 14. The motor 14 drives the drive axle 4 through the drive system 1, to rotate the stirring blade 13 via the stirring axle 12, and the stirring blade 13 kneads the ingredients into dough, which goes through the process of fermentation, shaping and baking before the bread is made. However, this type of bread-baking machine cannot meet the different tastes of the various family members because only the bread of one taste can be baked in its single bread chamber at one time.

SUMMARY OF THE INVENTION

Therefore, the object of this invention is to provide a novel multi-chamber bread-baking machine to overcome the above-said technical shortcoming.

A novel multi-chamber bread-baking machine according to the invention comprises a housing for housing all the parts of said bread-baking machine; one or a plurality of ovens; a plurality of bread chambers positioned in said oven(s); and a driving mechanism for driving the stirring blades in said chambers.

DETAILED DESCRIPTION OF THE PREFERRED EMBODIMENTS

According to the invention, the novel multi-chamber bread-baking machine comprises a housing for housing all the parts of said bread-baking machine; one or a plurality of ovens; a plurality of bread chambers positioned in said oven(s); and a driving mechanism for driving the stirring blades in said chambers.

Said driving mechanism is selected from the driving devices commonly used in this field. For example, one or more motors may be used to drive the stirring blades in the bread chambers, and preferably, one motor is used in the invention.

One or more ovens can be used in the invention. When the bread-baking process is going on at one and the same temperature, one oven should be used to save the space of the machine and the cost. And when the process is conducted at different temperatures, a plurality of ovens are needed.

The number of the bread chambers can be 2–6. In case bread is to be baked at different temperatures, then each bread chamber needs an oven for itself.

Said stirring blades positioned in the chambers may be driven by one or more motors. Preferably, one motor is used to drive all the stirring blades. In this case, the motor may be located at the center position among the bread chambers.

According to the invention, the housing may comprise a plurality of top covers corresponding to the bread chambers. Said housing further includes a control panel for controlling the entire baking process and the temperature of each oven.

In a preferred embodiment of the invention, both the numbers of the ovens and of the bread chambers are 2, and that of the motor is 1.

Figure 1:
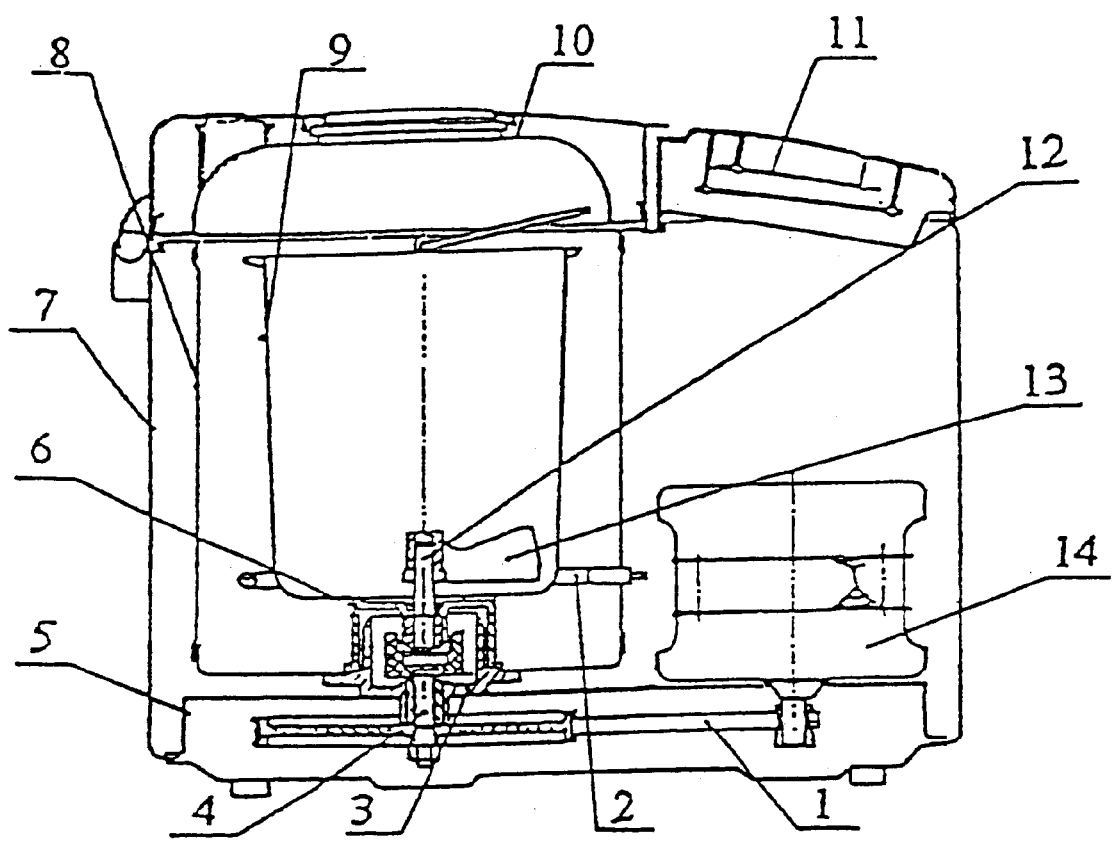
FIG. 1 is a structural view showing the single-chamber bread-baking machine of the prior art.
Figure 2:
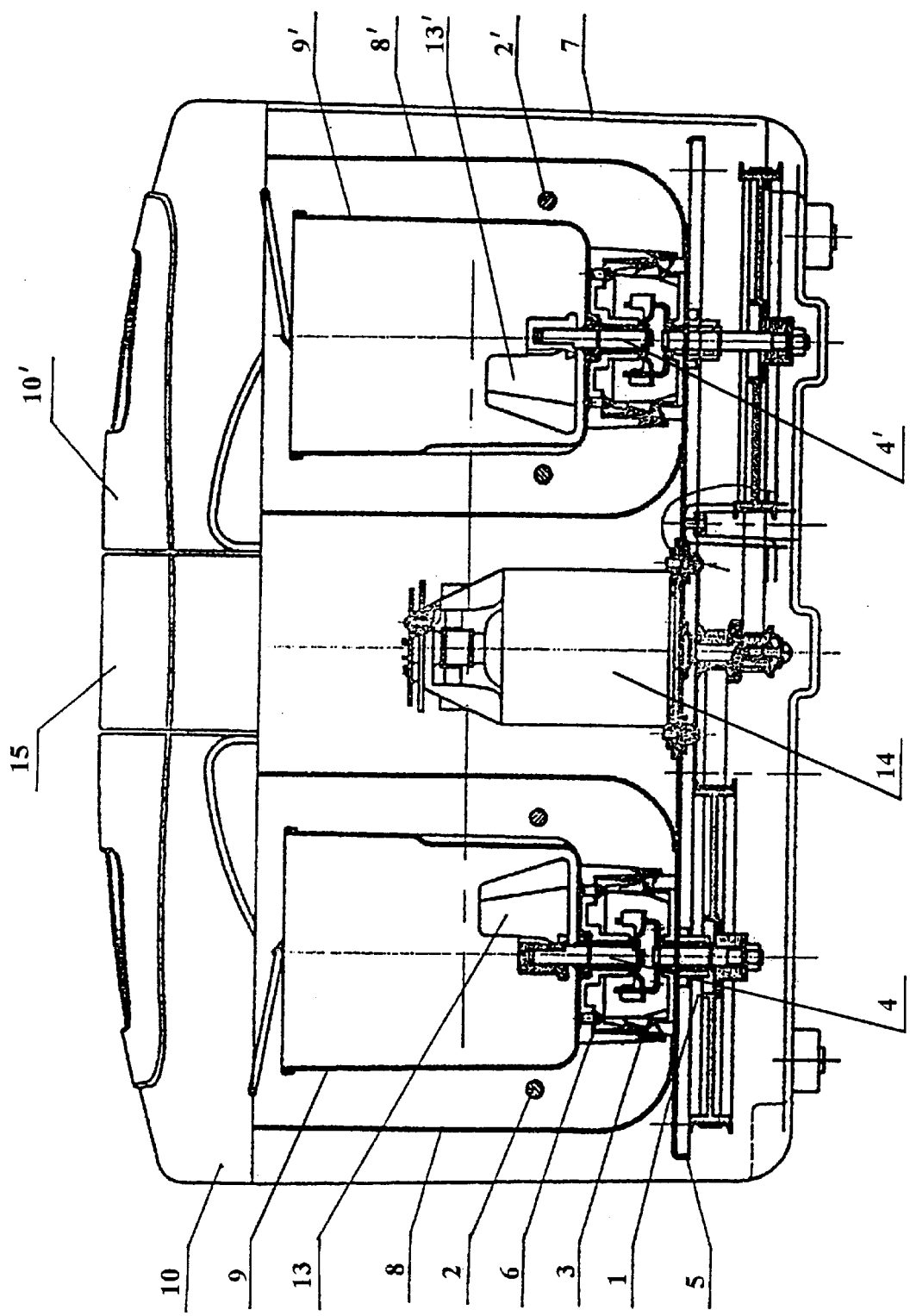
FIG. 2 is a structural view showing the double-chamber bread-baking machine according to a preferred embodiment of the invention.
Figure 3:
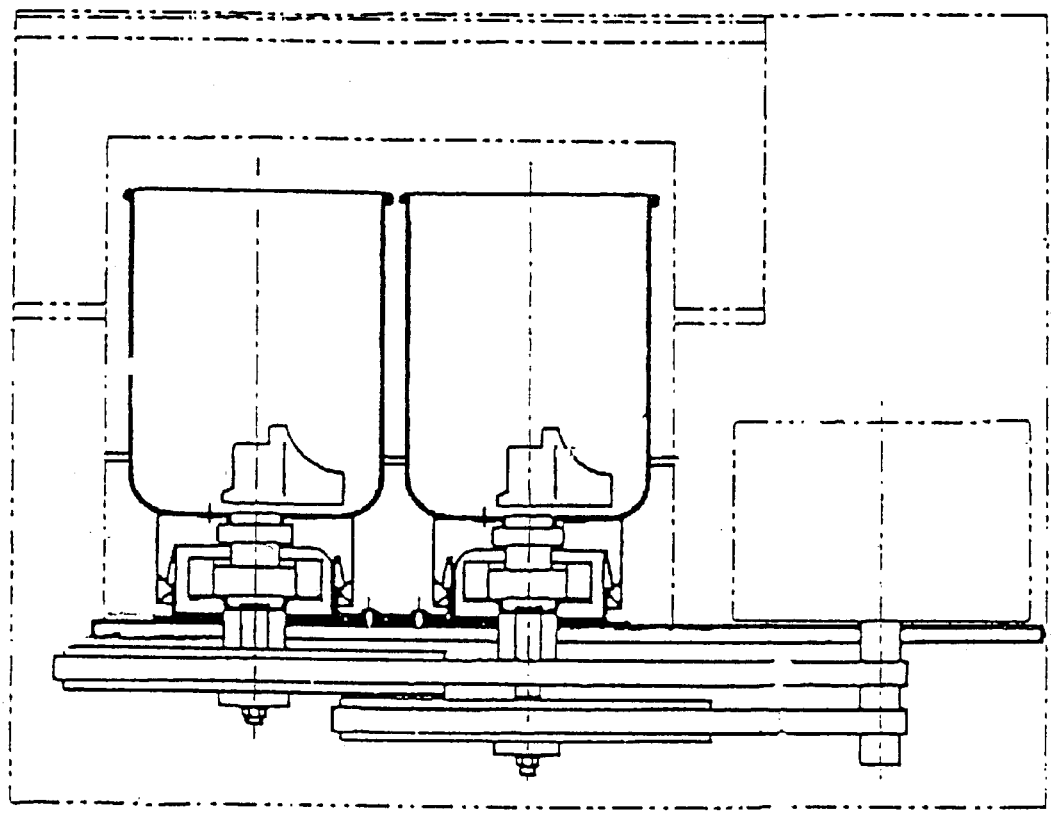
FIG. 3 is a structural view of a single-oven double-chamber bread-baking machine according to the present invention.

A preferred embodiment of the invention is now illustrated in detail with reference to the accompanying drawings. FIG. 2 is a structural view showing a bread-baking machine with two chambers. As shown in FIG. 2, the novel double-chamber bread-baking machine comprises a housing 7, which contains all the parts of said bread-baking machine; two ovens 8, 8'; two chambers 9, 9' corresponding to said two ovens 8, 8'; and a motor 14 for driving the stirring blades 13, 13' within said two chambers 9, 9' via a driving system 1. The housing 7 further includes a control panel 15 for controlling the entire baking process and the temperatures of each oven, as well as two top covers 10, 10'. A set of heating elements 2 is arranged in each oven. Moreover, the double-chamber bread-baking machine further includes a chamber base 6, a base board 5, two drive axles 4, 4', a base 3 and a circuit board (not shown), wherein two independent bread-baking units are formed through the joint operation of two ovens 8, 8', two heating elements 2, 2', two bread chambers 9, 9', and two stirring blades 13, 13'. In the embodiment, the motor 14 is positioned between the two bread chambers 9, 9'.

In the process of bread-baking, ingredients are first put into the bread chamber 9, 9'. Hereafter, the motor 14 drives the two drive axles 4, 4' via the drive system 1, to rotate the two stirring blades 13, 13'. Simultaneously, electricity can be supplied to the heating elements 2, 2' to initiate the baking process. The rotating speed of the motor, the current intensity and the baking time and temperature may be controlled by the operator through the control panel.

As a result of the two independent bread-baking units in the structure of this invention, bread of two tastes with different ingredients can be baked at the same time, with each independent unit baking bread of a certain recipe. Therefore, this new invention can either be used to bake one type of bread or to make bread of different tastes.

It is appreciated for those skilled in the art that the preferred embodiment and the accompanying drawings disclosed herein are illustrative and not limited, any modification or substitution derived from the claims or its equivalent should be covered in the scope of the invention.

What is claimed is:

1. A novel multi-chamber bread-baking machine, comprising:
   a housing for housing all the parts of said bread-baking machine;
   one oven or a plurality of ovens disposed in said housing;
   a plurality of bread chambers positioned in said oven;
   stirring blades disposed in said chambers; and
   a driving mechanism for driving the stirring blades;
   wherein said housing comprises a plurality of top covers corresponding to said bread chambers.

2. The bread-baking machine as claimed in claim 1, wherein said housing further comprises a control panel for controlling the temperature.

3. The bread-baking machine as claimed in claim 1, wherein said driving mechanism is a motor.

4. The bread-baking machine as claimed in claim 3, wherein both the numbers of the ovens and of the bread chambers are 2, and that of the motor is 1.

5. The bread-baking machine as claimed in claim 4, wherein the motor is arranged between the chambers.

* * * * *